Aug. 19, 1952 J. A. STANKAVICH ET AL 2,607,180
CRANBERRY HARVESTER
Original Filed Jan. 13, 1947 3 Sheets-Sheet 3
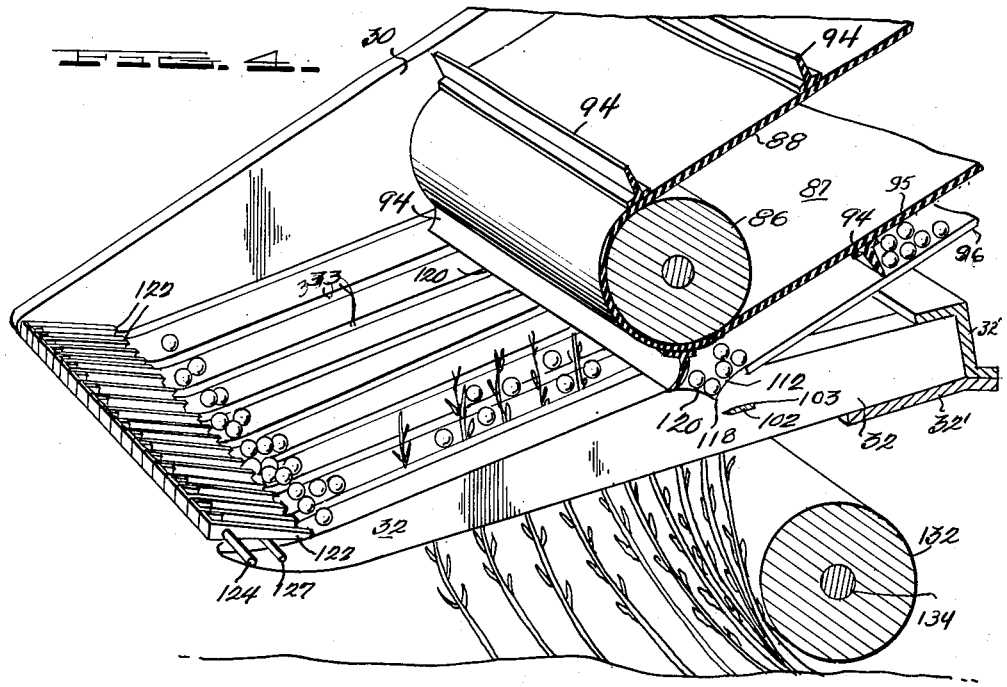
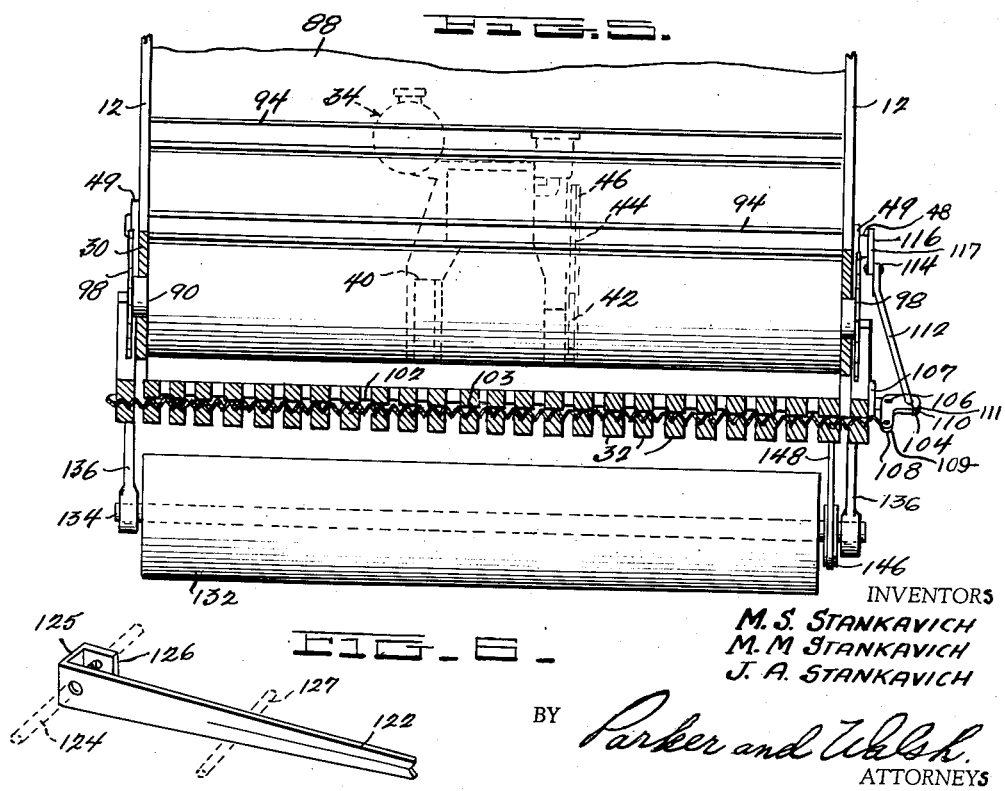
INVENTORS
M. S. STANKAVICH
M. M. STANKAVICH
J. A. STANKAVICH
BY Parker and Walsh
ATTORNEYS Patented Aug. 19, 1952

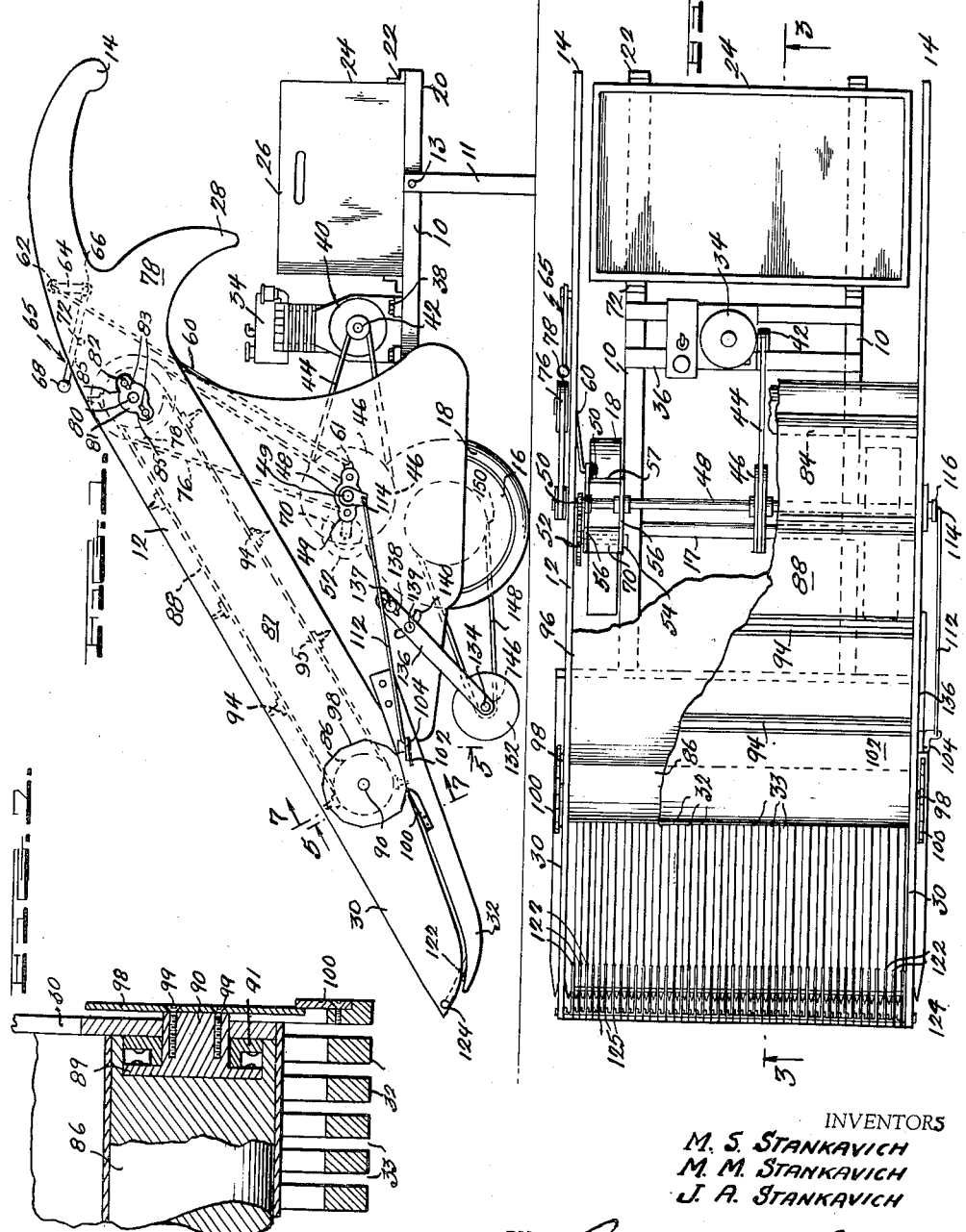

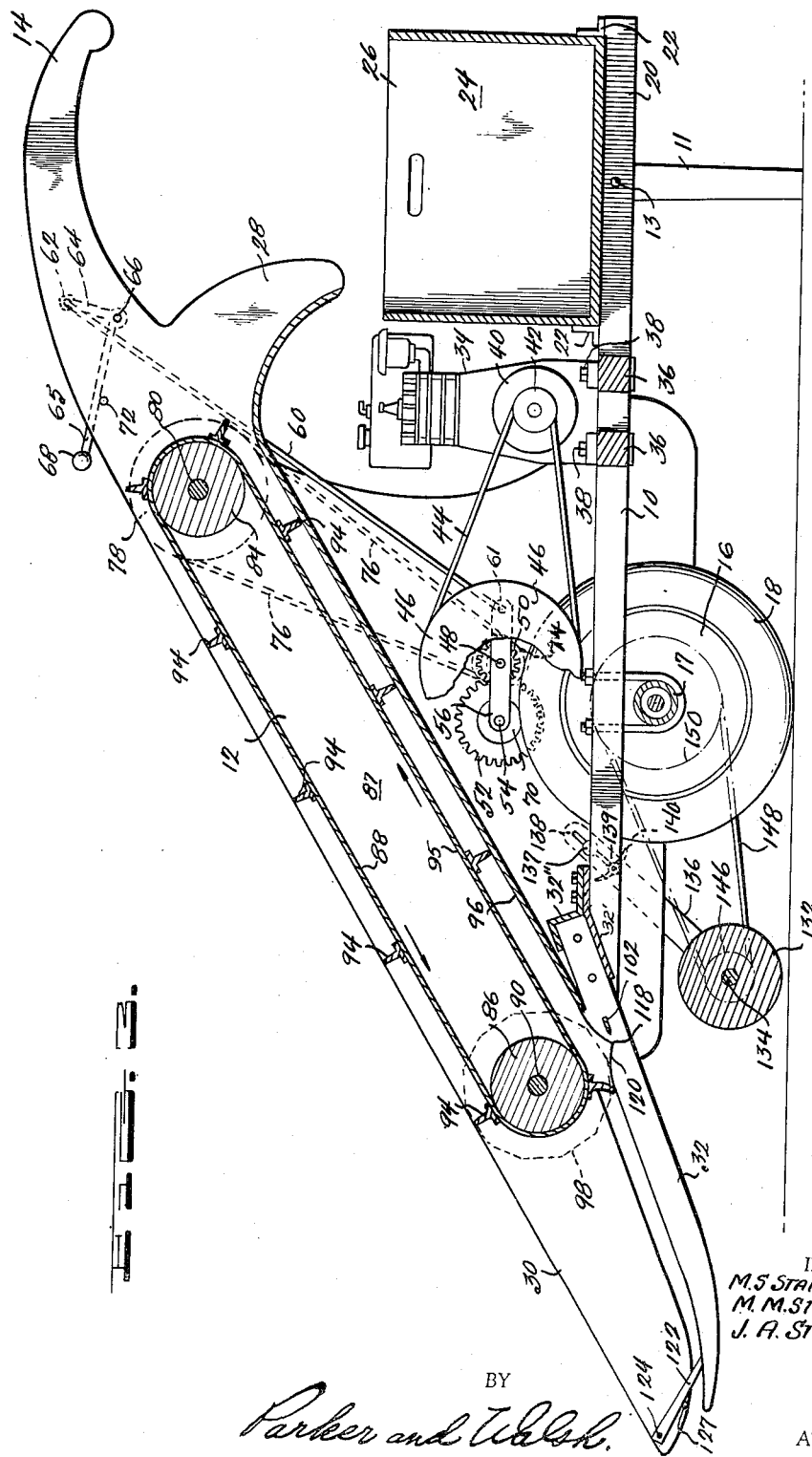

2,607,180

UNITED STATES PATENT OFFICE 2,607,180

CRANBERRY HARVESTER

Joseph A. Stankavich, Langlois, and Michael S. Stankavich and Matthew M. Stankavich, Bandon, Oreg., assignors, by direct and mesne assignments, to Western Pickers, Inc., Coos Bay, Oreg., a corporation of Oregon Original application January 13, 1947, Serial No. 721,814. Divided and this application February 13, 1950, Serial No. 143,846

7 Claims. (Cl. 56—330)

This invention relates to cranberry harvesters and is a division of our co-pending application, Serial No. 721,814, filed January 13, 1947, now abandoned.

The harvesting of cranberries by hand is laborious, time-consuming and consequently costly. A large number of workers are required to pick cranberries in a field of a given size, the hand picking operation involving hand scoops having projecting fingers which are forced into the tangle of vines and carefully raised so that the stalks of the vines pass through the teeth while the berries are collected on the teeth. Extreme care is necessary in hand picking since the berries are apt to be bruised and the younger vines may be pulled out at the roots or otherwise injured, thus damaging future crops.

In our co-pending application referred to above, there is disclosed a highly practicable cranberry harvesting apparatus wherein spaced rearwardly and upwardly sloping fingers are moved through the vines, the fingers preferably sloping at an angle of about thirty degrees, which has been found most highly satisfactory and efficient in operation. The stalks of the vines, as the apparatus moves forwardly, are subjected to a sufficiently gentle pull to largely prevent the breaking of stalks, and rearwardly of the forward ends of the fingers and arranged adjacent the ground is a hold-down roller which resists upward pull on the plants as the latter move relatively toward the rear ends of the fingers.

Beyond the upper ends of the fingers is arranged a mechanism serving as a conveyor for harvested berries, and serving also as means for catching stripped berries and for stripping berries which have not already been released from the plants. Associated with the lower ends of the device is a device which serves freely to permit passage of the vines and berries through and onto the fingers but which prevents loose berries from rolling from the lower ends of the fingers and becoming lost. The apparatus as referred to has been found highly meritorious in operation for performing its intended functions.

In the care of cranberry plants, it is highly desirable to prune the older taller plants, causing them to put out new young berry-bearing shoots, which will not occur if the stalks are permitted to grow indefinitely. Heretofore, it has been necessary not only laboriously to hand-harvest the berries, but also to perform a second laborious and time-consuming effort in the pruning of the plants.

An important object of the present invention is to provide novel means in the form of a self-propelled apparatus for pruning older cranberry plants, thus improving their productivity.

A further object is to provide a novel apparatus of the character referred to whereby both the harvesting and pruning operations can be simultaneously performed by means which cooperate to assist in the performance of both functions.

A further object is to provide such an apparatus wherein the hold-down roller serves the function not only of preventing the inclined fingers from pulling the plants from the ground but also serves to prevent the same disadvantageous result while the longer shoots of the vines are being pruned by the cutting means provided for this purpose.

A further object is to provide stripper means engageable with loose berries, and engageable with attached berries to remove them from the vines, to feed the berries rearwardly for collection, and to utilize the same stripper means for assisting in moving the upper ends of the taller stalks into the cutting means which performs the pruning operation.

A further object is to provide means for facilitating the foregoing operations while preventing damage to plants rooted outside the path covered by the apparatus and which plants will frequently have shoots projecting laterally and engageable with the fingers, such damage preventing means comprising cutting devices for cutting from the plants stems projecting into the apparatus from plants rooted outside the path of travel thereof.

Other objects and advantages of the invention will become apparent during the course of the following description.

In the drawings, we have shown one embodiment of the invention. In this showing, Figure 1 is a side elevational view of a completely assembled harvester in accordance with the present invention, Figure 2 is a top plan view of the harvester, parts being broken away to illustrate the interior construction, Figure 3 is a vertical longitudinal sectional view to an enlarged scale taken substantially along the line 3—3 of Figure 2, Figure 4 is an enlarged fragmentary perspective view with parts broken away illustrating a portion of the front end of the improved harvester and showing the same in operating position, Figure 5 is an enlarged transverse view taken substantially along the line 5—5 of Figure 1 showing portions of the apparatus in section, Figure 6 is an enlarged detail perspective view of one of the pivoted retaining fingers, and Figure 7 is an enlarged fragmentary detail section view on line 7—7 of Figure 1.

Referring to the drawings and in particular to Figure 1 thereof, the improved cranberry harvester comprises a generally horizontal frame 10, preferably of wood or other suitable light material, having a pair of thin curved plates 12, preferably of aluminum alloy or the like, attached at opposite sides thereof and terminating at their upper rearward portions in a pair of guiding handles 14. A pair of main supporting wheels 16 having rubber tires 18 thereon are rotatably mounted at opposite sides of the central portion of the frame 10 by means of an axle 17 and constitutes the primary means for supporting and driving the harvester in its movement over the ground.

One or more supporting legs 11 may be pivotally attached as at 13 to the rear portion 20 of the frame 10 for supporting the latter when the harvester is at rest and may be swung upwardly during operation.

At its extreme rearward portion 20 the frame 10 is provided with a plurality of brackets 22, preferably four in number, adapted to receive the bottom corners of a box or crate 24, the open top 26 of which is thus positioned to lie directly under a chute 28 attached to the upper portion of the side plates 12 and extending transversely across the full width of the harvester.

The harvester is provided with front side plate portions 30 formed as continuation of the side plates 12 and lying outwardly of and just above a plurality of horizontally spaced, tapered prongs 32 (Figure 2) which extend generally downwardly and forwardly from the frame 10 and are fixed thereto in any suitable manner, as by plates 32' (Figure 3). As shown in Figure 4, the side plates 30, and the prongs 32 having open grooves or spaces 33 therebetween, together constitute a relatively shallow scoop the function of which will be more fully explained.

Referring to Figures 1, 2 and 3, the power plant for the harvester is shown in the form of a small internal combustion engine designated generally by reference numeral 34, preferably of the four-stroke cycle type, and mounted upon the frame 10 in any suitable manner as by means of mounting cross members 36 and bolts 38. The shaft of the engine 34 is provided with the usual flywheel 40 and has securely attached thereto in any convenient manner a grooved pulley 42. The pulley 42 is connected by means of a flexible V-belt 44 to a larger grooved pulley 46 secured to a jack shaft 48 which in turn is mounted in suitable bearings 49 carried by the side plates 12 and will thus be continuously rotated whenever the engine 34 is operating.

The jack shaft 48 is provided with a small toothed gear 50 (Figure 3) in driving engagement with a relatively larger gear 52 rotatably journaled as at 54 in one end of each of a pair of levers 56 fixed to each other by a cross arm 57 (Figure 2). The levers 56 are freely pivoted at their center portion upon the jack shaft 48 and are connected at their other ends as at 58 to the bottom end 61 of a rod 60 pivotally connected at its top end as at 62 to one arm 64 of a bell crank 65. The bell crank 65 in turn is pivotally mounted as at 66 on one of the side frames 12 and has its other arm 68 extending upwardly in the form of an operating handle.

A roller 70, preferably made of a suitable friction composition and having a relatively small diameter, is firmly secured to the gear 52 for rotation with the latter and is suitably rotatably supported as by means of ball bearings or the like (not shown) by the levers 56.

It will be apparent that the friction roller 70, which is preferably located at the right-hand side of the harvester, is adapted to frictionally engage the rubber tire 18 of the right-hand wheel 16 to positively drive the latter by means of power furnished from the engine 34 through the pulley 42, the V-belt 44, pulley 46, jack shaft 48, and the gear wheels 50 and 52. Since the lever 56 is mounted for free pivotal movement about the jack shaft 48, it will also be apparent that the rod 60 may be actuated to engage or disengage the roller 70 with respect to the tire 18. In order to provide a positive acting mechanism for holding the friction roller 70 in constant engagement with the tire 18, it will be noted that the operating handle 68 may be moved forwardly into engagement with a suitable stop 72 to raise the pivot 62 above and forward of the pivot 66, thus constituting an over-center mechanism for retaining the rod 60 in elevated position. In order to disengage the friction roller 70 from the tire 18, it is of course only necessary to move the operating handle 68 rearwardly to return the parts to inoperative positions.

It will also be noted in Figure 3 that we have provided another grooved pulley 74 rigidly secured to the jack shaft 48 for rotation therewith and engaged with another V-belt 76. The V-belt 76 is thus continuously driven whenever the engine 34 is in operation and is connected at its upper end in driving relation to a pulley 78 secured to a shaft 80 which is rotatably mounted within suitable bearings 82 (Figure 1) preferably adjustably secured in any convenient manner upon the side frames 12, as for example by means of a separate bearing plate 81 having slots 83 through which bolts 85 may be inserted in order to secure the bearing plate 81 to the frame 12 in the desired position.

The pulley 78 thus serves to drive a conveyor assembly designated generally by the numeral 87 comprising an upper drum 84 and a lower drum 86 connected by means of a flexible endless belt 88, preferably of a rubberized canvas material or the like. The lower drum 86 is secured at its ends to heads 89 (Figure 7) the axial portions 90 of which are journaled in bearings 91 carried by the side plate portions 30. The axial portions 90 of the heads 89 project through and beyond the plate portions 30 for a purpose to be described.

The drums 84 and 86 extend transversely substantially the full width of the harvester between the side plates 12, and the endless belt 88 is of approximately the same width so as to substantially completely fill the space between the side plates. A plurality of tapered flexible strippers 94, preferably of rubber or the like, are spaced along the outer surface of the endless belt 88 and extend transversely substantially the full width of the latter. As the belt 88 travels in the direction indicated by the arrows in Figure 3, the strippers 94 of the lower run 95 of the belt contact with a bottom plate 96, preferably of a highly polished lightweight metal, and move upwardly therealong.

As shown particularly in Figure 7, a pair of polygonal cutter plates 98 is secured by pins 99 (Figure 7) to the axial portions 90 of the plates 89 and accordingly are rotatable with the drum 86 to effect a shearing action in cooperation with a pair of knives 100 mounted in approximately vertical position on the outermost of the prongs 32. In addition to the vertical cutters 98 there is also provided a horizontal cutter in the form of a toothed sickle bar 102 extending transversely through suitable openings 103 in the prongs 32 and adapted to be reciprocated to perform a cutting operation in conjunction with the latter.

As shown in Figure 5, the mechanism for reciprocating the sickle bar 102 preferably takes the form of a bell crank 104 pivotally mounted as indicated at 106 upon a bracket 107 suitably secured in any convenient manner to the adjacent prong 32 and having one arm 109 pivotally connected at 108 to the sickle bar 102 and its other arm 111 pivotally connected at 110 to a pitman 112. The pitman 112 in turn is pivotally connected at 114 to a crank 116 attached to the left-hand end 117 of the jack shaft 48 which projects through the side plate 12 for this purpose.

Referring to Figures 3 and 4, the prongs 32 are provided with transversely aligned notches 118 in the rear portions of their upper surfaces forming a trough extending across substantially the full width of the harvester and designated generally by reference numeral 120. The trough 120 is located adjacent the forward edge of the bottom plate 96 which extends to a line adjacent the rearward extremities of the open spaces 33 between the prongs 32. The vertical and horizontal cutters 98 and 102, respectively, are also located rather closely adjacent to this same vicinity and it will be further noted that the strippers 94 make their initial contact with the prongs 32 and bottom plate 96 and commence their upward and rearward travel at this region.

Referring to Figures 3, 4 and 6, a plurality of fingers 122, preferably formed as lightweight metal stampings of a suitable aluminum alloy or the like, are pivotally mounted upon a transverse rod 124 fixed at its ends to the front ends of the side plates 30. Each finger 122 is bent transversely as at 125 and then longitudinally as at 126 to form a short end through which the rod 124 also extends. The ends 126 of the fingers, thus offset from the fingers themselves, serve to space the fingers from each other. This spacing is less than the diameter of the average size cranberry to prevent the berries from rolling down the prongs 32 and being dropped from the forward ends thereof. However, the fingers 122 move freely upwardly for the passage of vines and berries therebeneath. Downward movement of all of the fingers is limited by a cross bar 127 fixed at its ends to the side plate portions 30, this limiting means being particularly important as to those fingers 122 which lie between the prongs 32.

In order to avoid uprooting or otherwise injuring the cranberry bushes during the harvesting operation, a roller 132 is rotatably mounted upon a suitable shaft 134 journaled in the front end of a pair of mounting arms 136 and adapted to firmly engage the bottom portions of the vines during picking. As shown particularly in Figures 1 and 3, the mounting arms 136 are connected by bolts 137 to the plates 12, the arms 136 being slotted as at 138 for the adjustable reception of such bolts. Each arm 136 is also connected to its associated plate 12 by a bolt 139 passing through an arcuate slot 140 in such plate, to provide for swinging adjustment of the arms 136 for a purpose which will become apparent. It will be noted from Figures 1, 3 and 4 that the strippers 94 engage the prongs 32 only slightly forwardly of a plane normal to the prongs 32 and tangential to the forward portion of the roller 132, and that the cutter 102 lies rearwardly of this plane.

A pulley 146 is firmly secured to the roller 132 and is adapted to be driven as by means of a V-belt 148 which passes around the pulley 146 and also around a larger pulley 150 firmly attached to one of the main wheels 16 and rotatable with the latter. The bolts 137 and 139 provide adjusting means for tensioning the belt 148 and for adjusting the elevation of the roller 132.

*Operation*

The position of the roller 132 is first suitably adjusted by means of the bolts 137 and 139 to a proper elevation above the ground, which is determined in accordance with the nature of the terrain and the conditions of growth of the particular cranberry bog to be harvested. The supporting leg 11 may then be swung upwardly to its raised position and the engine 34 started in the usual manner.

As soon as the engine 34 has been started, the conveyor assembly will commence to operate by virtue of the driving connection through the pulley 42, V-belt 44, pulley 46, jack shaft 48, pulley 74, V-belt 76, and pulley 78 and will continue to operate as long as the engine 34 is running. Such operation of the conveyor assembly moves the endless belt 88 in the direction indicated by the arrows in Figure 3 to cause the strippers 94 to move upwardly along the bottom plate 96, and rotates the polygonal cutter discs 98 attached to the lower drum 86. The sickle bar 102 will be reciprocated through its connection with the jack shaft 48 by means of the bell crank 104, pitman 112, and crank 116.

The operator then grasps the handles 14 of the harvester and moves the operating handle 68 forward against the stop 72, thus pulling the rod 60 and engaging the friction roller 70 with the rubber tire 18 of one of the main wheels 16. The engine 34 then starts to move the harvester forward through the bog. Motive power is transmitted from the pulley 42, V-belt 44, pulley 46, jack shaft 48, gear 50, and gear 52 to the roller 70 and thence to the adjacent wheel 16.

As the harvester moves forward through the bog, the vines and stalks of the cranberry bushes are received within the open spaces 33 between the tapered prongs 32, the fingers 122 pivoting freely upwardly to permit the entrance of the vines thereto. Any cranberries which are disengaged by the upward wedging movement of the top surface of the prongs 32 relative to the vines are carried upwardly by the latter to the trough 120 and, in the event any of the berries are not thus moved upwardly due to insufficient vines being present or for any other cause, the berries will not be lost as they are larger than the width of the spaces 33 and will be prevented from rolling downwardly off the forward ends of the prongs 32 by means of the fingers 122.

When the detached cranberries as well as the upper portions of the vines, together with the remaining attached berries, reach the vicinity of the trough 120 the strippers 94 engage and move rearwardly berries which are detached from the plants by the prongs and which are moved upwardly by the plant stems. The strippers 94 also engage attached berries to remove them from the stems without bruising. Such berries picked up and detached by the strippers are moved thereby upwardly and rearwardly over the plate 96 to be ultimately discharged through the chute 28 and into the open top 26 of the box 24.

In engaging the plants to strip berries therefrom, the strippers also serve to move the upper ends of the taller plants rearwardly into engagement with the cutter bar 102. In addition, the strippers move the cut ends of the plants rearwardly away from the cutter bar thus preventing jamming of the upper ends of the spaces between the prongs with plant ends and interfering with both the pruning and harvesting operations.

The sickle bar 102 prunes the tops of any vines which are sufficiently long to reach upwardly thereto as the upper portions of the vines pass between the prongs 32. Any shorter vines will have the berries thoroughly stripped by the prongs 32 as the machine progresses over the ground. This pruning of the longer vines is beneficial to the vines as is true of most pruning operations. Moreover, if such pruning did not take place, the vines would cause an excessive drag on the machine in its forward progress and this drag would be disadvantageous for two reasons. In the first place, it would require excessive power to propel the apparatus, and it would result in uprooting many of the vines.

It will thus be seen that the cooperative arrangement of the prongs 32, strippers 94 and cutter bar 102 is highly advantageous. As will be apparent from Figures 3 and 4, the strippers 94 engage the prongs adjacent the upper ends thereof where the prongs have completed their operation of stripping berries from the plants so that the strippers can complete the stripping of berries from the plants at heights above the prongs at the point of initial operation of each stripper. At such point, the upper ends of the plants which are to be cut are still attached to the lower ends of the plants so that the latter will be effectively held down until the stripping operation is completed. Moreover, the point of engagement of the strippers with the tops of the prongs takes place at a point in advance of the cutter bar and accordingly effectively feeds the plants into the cutter. In addition, these elements cooperate in a manner to provide for the simultaneous harvesting of the berries and the pruning of the plants, thus making it wholly unnecessary to prune the plants in a latter separate operation which is relatively expensive from the standpoint of expenditures for labor.

The hold-down roller 32 also enters into the functioning of the parts referred to above. In the hand harvesting of cranberries, the unskilled laborers exert a substantial pull on the plants and this pull is directly transmitted to the plant roots. As a result, a serious proportion of the plants is uprooted and such plants are lost from further berry production. With the present apparatus, the engagement of the prongs with the plants as the prongs move forwardly tends to lean the plants in such direction as suggested in Figure 4. The shorter plants, which are not to be pruned, pull quite readily through the prongs and the taller plants have their upper ends remaining between the prongs to be engaged by the strippers. These strippers and the engagement of the cutter bar with the plants as the apparatus moves forwardly transmit a pull to the plants which has some tendency to uproot them. The relatively heavy hold-down roller 32 functions at such point to prevent the uprooting of the plants. The roller 132 rolls over the base portions of the plants just prior to the transmission of the pull to the plants, thus preventing their being uprooted. Of course, some upward pull is transmitted to the plants due to relative upward movement of the prongs, and this pull would be present regardless of the pruning mechanism. Thus the hold-down roller 132 functions to prevent any uprooting of the plants by both the harvesting and pruning operations.

The side cutters 98 also cooperate with the other elements to prevent damage to the plants. As the vines are engaged by the forward ends of the prongs 32, a certain number of the vines will have end portions projecting beneath the forward end of the plate portion 30 and thus will project laterally from the apparatus. These vines are not engaged by the hold-down roller and any substantial pull thereon, as by jamming against the lower forward edge of the side plates 12, would tend to uproot, at least some of them, and result in increased drag on the apparatus. This is prevented by the rotary cutters 98 which in cooperation with the stationary blades 100 (Figure 7) shear off such vines. In this connection, the use of polygonal cutters 98 has been found advantageous over circular cutters since the intersecting point of each cutter 98 and its associated blade 100 moves back and forth along the latter as the distance between such intersecting point and the axis of the roller 86 varies incident to the polygonal shape of the cutters. This provides a highly efficient shearing action. Thus the sickle bar 102 and the rotary cutters 98 serve to reduce the power necessary to propel the apparatus while at the same time improving the vines by pruning them.

The trough 120 performs a dual function. First, it provides a collecting point for the berries to facilitate engagement thereof by the strippers 94. Second, since the movement of the vines relatively upwardly along the fingers 32 necessarily provides some tensioning of the vines, this tensioning will be released as the taller vines reach the trough 120, thus preventing the strippers 94 from increasing the pulling action on the vines while at the same time facilitating the pruning of the vines by the sickle bar 102. The strippers 94 engage the berries collecting in the trough 120, together with any small quantity of clippings therein, and convey them upwardly along the plate 96.

It has been found to be entirely practical in operating our improved cranberry harvester to employ one man to guide the machine and another man to handle the boxes 24 and replace them from time to time as they become full. This feature results in a saving of manpower which is quite marked in comparison with the number of people required to perform an equivalent amount of harvesting by hand methods and thus constitutes an important improvement over present cranberry harvesting practices.

As an ancillary but highly important result, our improved cranberry harvester renders night operations entirely practicable due to the practically automatic nature of the machine which insures clean picking under substantially all conditions.

Although we have disclosed the use of flexible V-belts and pulleys herein as a preferred form of power transmission between the engine 34 and the various power operated units of the machine, it will be clear that equivalent devices such as chains and sprockets or continuous gearing could equally well be employed for this purpose.

While the apparatus has been particularly described as a cranberry picker, it will be apparent that it is capable of wide use for harvesting other crops, for example nuts, prunes and peas. Moreover, while the pruning characteristics of the apparatus have been illustrated and described in combination with the harvesting function, the apparatus, without the harvesting and gathering means including the conveyor and the plate 96 over which it operates, is fully operative solely for the purpose of pruning plants, and particularly cranberry vines.

In this connection, it is pointed out that to keep cranberry vines in proper shape and in vigorous growth for maximum production, it is necessary that the vines be maintained properly pruned. This work is ordinarily slowly and laboriously performed by hand at a very substantial cost. The elements including the prongs 32, sickle bar 102 and rotary cutters 98, and the elements associated therewith, are movable over the ground and through the vines to rapidly prune substantial areas of the plants. The inclined plane arrangement of the prongs 33 exerts some upward force on the plants to tend to straighten them vertically, and any portions of the plants extending above the level of the sickle bar 102 will be cut off. Any portions of the plants extending laterally from the prongs will be similarly pruned by the rotary cutters 98. Wholly aside from the use of the apparatus for harvesting cranberries, therefore, the apparatus is highly useful solely for pruning purposes. When so used, the apparatus is capable of effectively pruning large areas of plants at a mere fraction of the cost of hand pruning and the pruning operation is more effectively and uniformly carried out.

The present apparatus accordingly has been found efficiently to perform its intended functions of pruning plants and harvesting fruit therefrom without injury to the plants or roots, and at a very low cost. The present apparatus, with a single unskilled operator, will harvest in a given period many times the quantity of berries which can be harvested by hand or by any other known apparatus. Moreover, the performance of the pruning operation simultaneously with the harvesting operation and by the use of a number of the same elements which assist in performing the harvesting operation, eliminates the later necessary but costly separate pruning of the plants.

We claim:

1. A cranberry harvester comprising a mobile frame, power means mounted on said frame, a plurality of laterally spaced prongs attached to the forward end of said frame and extending downwardly and forwardly with respect to said frame, a hold-down member rotatably mounted on said frame transversely thereof and spaced from the front end of said frame normally in close proximity to the ground beneath said prongs, a stripper mounted on said frame transversely thereof above said hold-down member and said prongs for engagement with the latter at substantially the same distance from the ends thereof as said hold-down member, said stripper having a surface movable rearwardly relative to said frame, a cutter mounted on said frame transversely thereof intermediate said stripper and said hold-down member, and driving means interconnecting said hold-down member, said stripper, said cutter, and said power means.

2. A cranberry harvester as set forth in claim 1, wherein said hold-down member comprises a cylindrical roller and said cutter comprises an endwise reciprocable sickle.

3. A cranberry harvester as set forth in claim 1 wherein said prongs are provided with aligned notches arranged transversely of said frame and rearwardly of the line of engagement of said stripper with said prongs.

4. A cranberry harvester as set forth in claim 1, including a plurality of laterally spaced fingers, means individually pivotally mounting said fingers at one end on said frame transversely thereof above the forward ends of said prongs, said fingers extending downwardly from said pivotal mounting means in releasable engagement with the front ends of said prongs.

5. A cranberry harvester as set forth in claim 1, wherein said stripper comprises an endless belt having a lower run extending rearwardly of said prongs and a plurality of flexible stripper elements carried by said belt in spaced relation to each other and extending substantially continuously across said prongs.

6. A cranberry harvester as set forth in claim 5 including a plate substantially co-extensive in width with said stripper element and mounted on said frame beneath and substantially parallel to the lower run of said endless belt, said plate extending rearwardly and upwardly from the uppermost ends of said prongs, said stripper elements in the lower run of said conveyor being normally engageable with said plate.

7. A harvesting and pruning apparatus comprising a mobile frame, power means mounted on said frame, a plurality of laterally spaced prongs secured to said frame and inclined downwardly and forwardly with respect to the normal direction of movement of said frame, a stripper mounted on said frame transversely thereof above said prongs and movable into engagement therewith intermediate the ends thereof, a hold-down member rotatably mounted on said frame beneath said stripper and prongs and normally in close proximity to the ground, a cutter mounted on said frame and disposed transversely thereof intermediate said stripper and hold-down member and positioned adjacent a plane which is tangent to the forward surface of the hold-down member and which intersects the prongs substantially at right angles thereto, and driving means interconnecting said hold-down member, said stripper, said cutter and said power means.

JOSEPH A. STANKAVICH.
MICHAEL S. STANKAVICH.
MATTHEW M. STANKAVICH.

REFERENCES CITED

The following references are of record in the file of this patent:

UNITED STATES PATENTS

| Number | Name | Date |
|---|---|---|
| 81,897 | Hall | Sept. 8, 1868 |
| 242,189 | Cunningham | May 31, 1881 |
| 594,409 | Mahon et al. | Nov. 30, 1897 |
| 664,406 | Harms et al. | Dec. 25, 1900 |
| 1,366,001 | Hurd | Jan. 18, 1921 |
| 1,907,467 | Tervo et al. | May 9, 1933 |
| 2,298,121 | Grimes | Oct. 6, 1942 |
| 2,355,273 | Case | Aug. 8, 1944 |